Patented Feb. 17, 1925

1,526,398

UNITED STATES PATENT OFFICE.

OTTO TROELL, OF HOKOPINGE, SWEDEN.

PROCESS FOR PRODUCTION OF NITROGEN COMPOUNDS BY ABSORPTION OF NITROGEN IN A MIXTURE OF REACTION.

No Drawing.   Application filed June 10, 1924. Serial No. 719,110.

*To all whom it may concern:*

Be it known that I, OTTO TROELL, a citizen of Sweden, residing at Hokopinge, Sweden, have invented certain new and useful Improvements in Processes for Production of Nitrogen Compounds by Absorption of Nitrogen in a Mixture of Reaction, of which the following is a specification.

My invention relates to the production of nitrogen compounds by the absorption of pure nitrogen in a mixture of carbon and alkali metals or alkaline earth metals, or their compounds. For this purpose, either pulverous mixtures or briquettes or pieces of varying shapes have been used.

With the use of pulverous material, however, it has proved very difficult to pass the gases through the same, and such material is strongly disposed to form baked masses or lumps. The pieces or briquettes produced in different ways all have a uniform hardness throughout, so that they either are broken more or less during their transport and in the shaft of the furnace before the reaction, or their great hardness will prevent the nitrogen from intruding to the interior parts at the same time preventing the gases produced by the reaction from escaping.

According to the present invention these drawbacks are avoided by the use of briquettes or grains of spherical or substantially spherical form, the interior of said grains or balls being comparatively porous in order to facilitate the passage of the gases while their surface is sufficiently hard and smooth to make possible the transport of the material or the passing thereof through a shaft of a furnace to the chamber of reaction without disaggregation or any dust being raised. By the influence of the reaction, the hard exterior layer, which is comparatively thin and of a uniform thickness, will become so porous that the gases can pass through the same without the firmness of the balls being reduced to such an extent that the balls are broken.

Briquettes or balls of this type may be produced in any known way, it being however understood that the treatment must be carried out carefully and slowly in such a way that the balls will become hard only on their surface.

One way of producing such spherical or nearly spherical balls or grains is as follows:

A suitable mixture of carbon and alkali metals or alkaline earth metals, or their compounds is first dried, preferably in one or more internally heated rotating cylinders, to remove the excess of water, as this would interfere with the agglomerating operation. In such drying apparatus soft balls of rather irregular shape commence to be formed. From the drying apparatus the mixture is then carried to another set of rotating cylinders, through which are passed gases containing steam for keeping the degree of moisture constant. The balls now develop into hard, almost perfectly spherical grains or balls.

By using grains or balls having the properties mentioned above the worst impediments of the reaction are eliminated and the reaction may pass even to a point corresponding to the chemical state of equilibrium.

What I claim is:

The process of producing nitrogen compounds by absorption of nitrogen gas in mixtures of reaction, which consists in passing the nitrogen through a mixture the ingredients of which are formed into spherical grains having a comparatively hard and smooth surface layer of a uniform thickness covering an inner porous mass permeable to gases.

In testimony whereof, I have signed my name to this specification in the presence of two subscribing witnesses.

OTTO TROELL.

Witnesses:
 EIN EINSON,
 GUNHILD PETERSSON.